United States Patent [19]
Salmon

[11] 4,330,149
[45] May 18, 1982

[54] SUSPENSION DEVICE, FOR THE SUSPENSION OF A CABIN IN PARTICULAR, ON THE CHASSIS OF A VEHICLE

[75] Inventor: Claude Salmon, Marly le Roi, France

[73] Assignee: Société Anonyme dite: UNIC S.A., Trappes, France

[21] Appl. No.: 143,401

[22] Filed: Apr. 25, 1980

[30] Foreign Application Priority Data

May 9, 1979 [FR] France ................................ 79 11774

[51] Int. Cl.³ ............................................ B62D 33/06
[52] U.S. Cl. .................................................. 296/190
[58] Field of Search ................ 296/190; 248/592, 594, 248/608, 584, 587

[56] References Cited
U.S. PATENT DOCUMENTS

| | | | |
|---|---|---|---|
| 3,554,596 | 1/1971 | Le Fevre | 296/190 |
| 3,944,017 | 3/1976 | Foster | 296/190 |
| 3,958,659 | 5/1976 | Selman | 296/190 |
| 4,193,629 | 3/1980 | Merkle | 296/190 |
| 4,235,470 | 11/1980 | Kauss et al. | 296/190 |

Primary Examiner—Robert R. Song
Attorney, Agent, or Firm—Arthur B. Colvin

[57] ABSTRACT

Suspension device, for the suspension of a cabin on a vehicle chassis.

The undertray of the cabin is suspended in at least three points on the chassis of which at least one point at the front and two points at the rear, the middle front point of the cabin suspended by an elastic element of low frequency being connected to the chassis by a means for guiding the undertray of the cabin and said cabin being connected to the chassis by an elastic return means for controlling the roll of the cabin.

The invention finds an application for the suspension of truck cabins.

9 Claims, 8 Drawing Figures

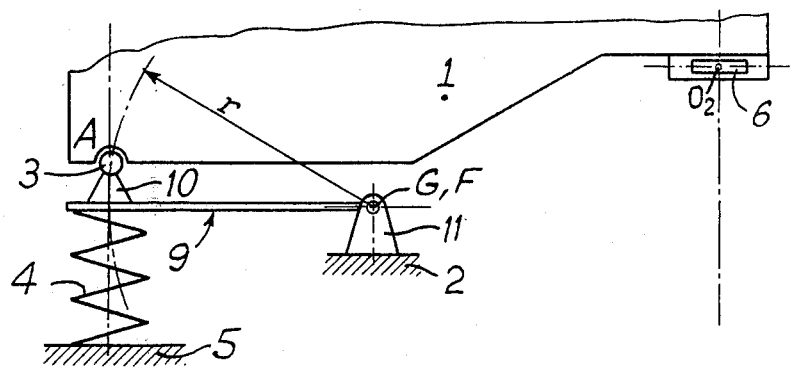
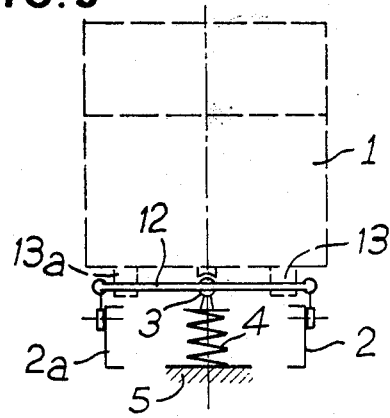
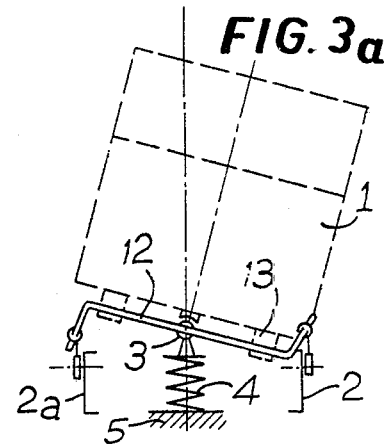
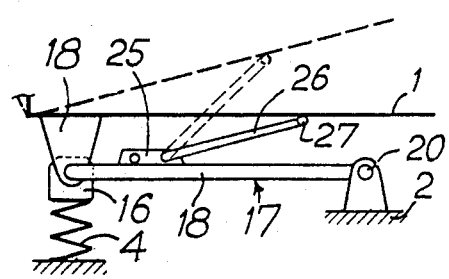
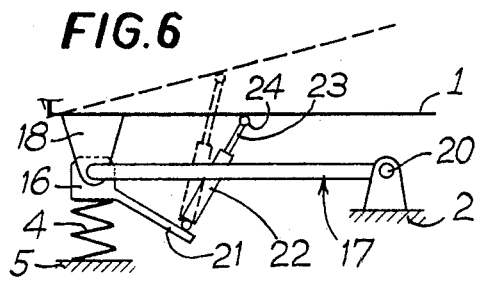
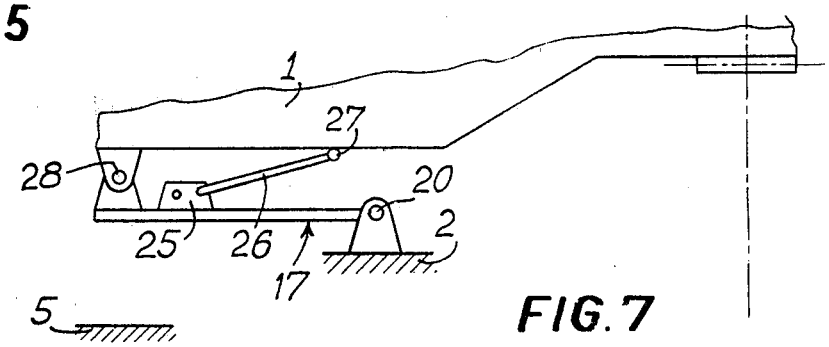

SUSPENSION DEVICE, FOR THE SUSPENSION OF A CABIN IN PARTICULAR, ON THE CHASSIS OF A VEHICLE

The present invention relates to a suspension device, for the suspension of a cabin in particular, on a vehicle chassis.

Researches conducted on the vibrations of the suspended mass of a vehicle cabin have revealed the cabin deflection mode and the existence of vibration nodes at the back of the rear axle, as well as at the back of the cabin. Then it becomes obvious that the front end of the chassis is the centre of high oscillation amplitudes.

It would seem therefore that an efficient improvement of the comfort can be obtained by acting only on the front suspension of the cabin. The amplitudes noted at the back being clearly weaker, the natural frequency may there be greater.

The frequency band which is physiologically interfering is known and extends between 3 and 8 Hz for the vertical oscillations.

The front suspension should therefore be characterized by a natural frequency less than 3 Hz and preferably as close as possible to 1 Hz.

However, the increase in the flexibility of the cabin suspension elements results inevitably in an increase in the lateral instability of the suspended mass.

It is the object of the present invention to propose a suspension which fulfills these various conditions.

According to the present invention, the undertray of the cabin is suspended in at least two points on the chassis of which at least one point at the front and two points at the rear, the front middle point of the cabin, suspended on any type of static element of low frequency being connected to the chassis by a means for guiding the undertray of the cabin, and the said cabin being connected to the chassis by a lateral elastic return means.

It is possible with this suspension arrangement to obtain a considerable improvement in comfort by considerably reducing the natural frequency at the front.

The use of a front central suspension permits the presence of straight side members and the raising of the centre of rotation, hence a reduction of the lateral torque.

The device according to the invention permits to reduce to a minimum the number of moving parts in the suspension (relatively small extra weight and costs compared with the level of comfort obtained).

A most advantageous distribution of the forces applied on to the undertray of the cabin thus permits to use a cabin structure resembling those currently used in the motorcar industry.

An increase in the space available to install various controls coupled to the driving position is obtained due to the fact that the elastic element is located in the free area situated at the middle fore end.

The invention will be more readily understood on reading the following description with reference to the accompanying drawings, in which:

FIG. 2 is a side elevation of the suspension means shown in FIG. 1;

FIGS. 3 and 3a are front elevations of the suspension means showing the anti-roll bar;

FIG. 5 is a side elevation of the suspension means with a rotation means using a torsion bar;

FIG. 6 is a side elevation of the suspension means with a rotation means using a jack;

FIG. 7 is a side elevation of another embodiment of the suspension means.

Figure 1:
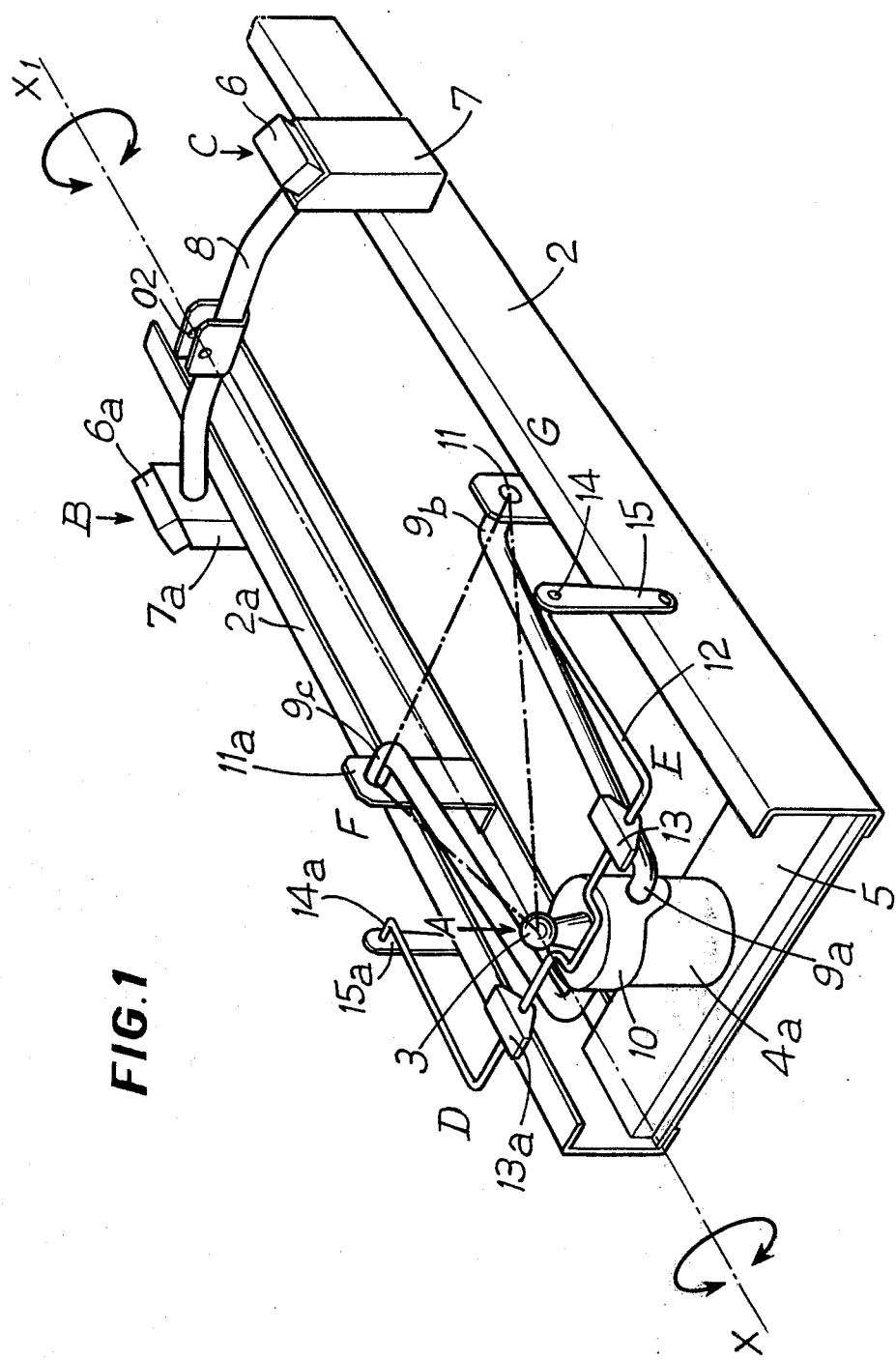
FIG. 1 is a perspective view of the cabin suspension means according to the invention.

FIGS. 1, 2 and 3 show one embodiment of a suspension device for a cabin 1 on the side members 2, 2a of a vehicle chassis. The suspension of the cabin on the chassis is produced by means of three points A, B and C, of which a central point A situated at the front of the vehicle is constituted by a spherical joint comprising a knuckle 3 supported by an elastic member 4 of low natural frequency (FIG. 2) mounted on a cross member 5 connecting the two side members 2, 2a.

FIG. 1 diagrammatically illustrates the elastic member by its receptacle 4a.

At the rear, the undertray of the cabin 1 rests on two suspension points constituted by blocks 6, 6a in elastic material, which are fitted on uprights 7, 7a fixed respectively on the side members 2, 2a joined by a cross member 8. The two suspension points 6, 6a are arranged symmetrically with respect to the rolling axis $xx_1$ of the cabin 1.

The assembly is guided by means of a rigid triangulated member 9 the top end 9a of which is integral with a support member 10 of the knuckle 3 through which it rests on the elastic member 4. The base of the triangulated member 9 is provided with two pivots 9b, 9c mounted in two bearings 11, 11a integral with the side members 2, 2a of the chassis.

The transverse angular movement of the cabin are repealed by an anti-roll bar 12 the center of which is pivotally mounted, by way of bearings 13, 13a, on the cabin 1 and the ends 14, 14a of which are mounted for pivoting in bearings 15, 15a integral with the side members 2, 2a of the chassis.

When the cabin 1 moves in a longitudinal plane (FIG. 2) any vertical urge of the cabin 1 causes a circular central movement (G,F) of the point A of the cabin. The ratio of the distances A. (G,F) and A.02, as well as their relative positions are predetermined to limit the longitudinal movements of the point 02.

The movements of the cabin in the transverse plane are illustrated in FIGS. 3, 3a. Any rolling of the cabin 1 is repealed by the angular flexibility of the torsionally active part of the anti-roll bar 12.

Figure 4:
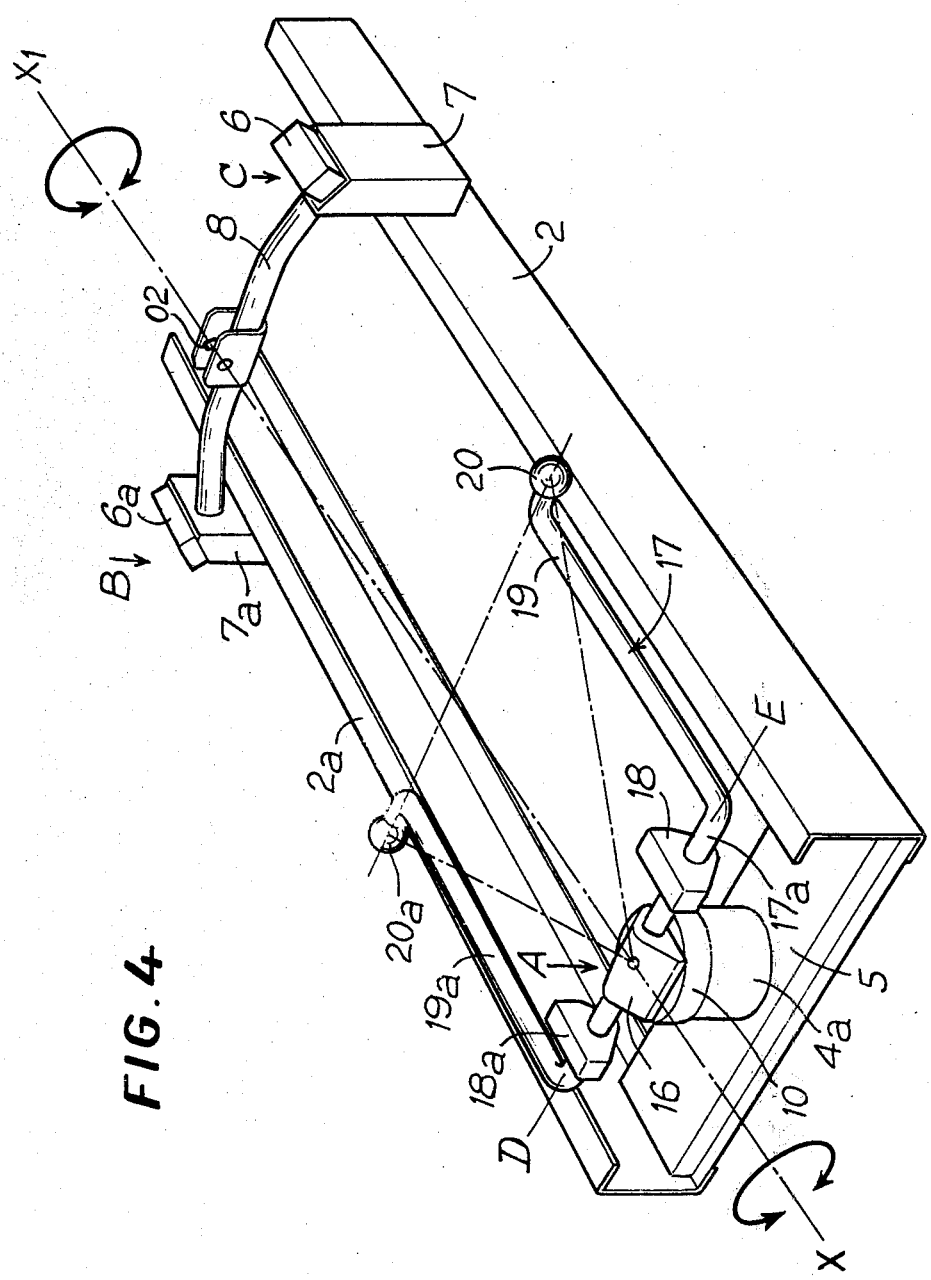
FIG. 4 is a perspective view of another embodiment of the cabin suspension means according to the invention.

FIG. 4 shows a variant embodiment of the cabin suspension device, wherein the two anti-roll and guiding functions, which are uncoupled in the embodiment shown in FIG. 1, are in this case assumed by a single member.

The support 10 of the front suspension point A comprises a bearing 16 inside which is secured the front bar 17a of a guiding and inclination readjustment member 17. Said front bar 17a pivotally mounted in bearings 18, 18a integral with the undertray of the cabin. The member 17 further comprises two lateral bars 19, 19a which are pivotally mounted at their ends, by means of knuckle joints 20, 20a on the side members 2, 2a.

The stiffness of the bars 19, 19a and of the nodes D and E, conditioned by the guiding requirements, is such that any angular movement of the said bars generates two equal and opposed torques at the ends of the front bar 17a. Said latter has a sufficient angular flexibility to repeal any inclination of the cabin. The presence of a cabin suspension necessitates a new design of the rotation device. Indeed, said latter should not impair the free movements of the cabin.

FIG. 6 shows a suspension device comprising a hydraulic rocking means in which the bearing 16 fast with the front bar 17a is provided towards the rear with an arm 21 on which is pivotally mounted the body 22 of a hydraulic jack 23 of which is pivotally mounted in 24 on the undertray of the cabin 1. The jack 22 gives the torque necessary for lifting the cabin 1. This arrangement of the compass type is such that the jack in the rest position moves in union with the guiding and inclination readjustment member 17.

FIG. 5 shows a suspension device comprising a rocking means which uses torsion bars. On the bars 18, 18a are anchored in 25, at one of their ends, torsion bars 26, the other end 27 of which rests against the undertray of the cabin 1. Said torsion bars 26 move, as in the preceding example, in union with the guiding member 17.

It is then obvious that any vertical urge of the front part of the chassis 2, 2a on the cabin 1 will entail a deformation of the torsion bars 26, which will then be playing the part of additional bearing springs.

FIG. 7 shows a simplified version of the embodiment of FIG. 5, wherein the elastic member 4 on which rests the front suspension point 3 has been removed. Indeed, in a few cases where the limits can be defined, the angular flexibility of the torsion bar 26 needed to lift the cabin is compatible with obtaining the desired vertical vibration frequency of the front of the cabin.

In this case, the cabin 1 is suspended by four points, amongst these the two contact points 27 between the torsion bar and the undertray of the cabin.

The invention is not limited to the embodiments described but on the contrary covers any variants that may be brought thereto without departing from the scope thereof.

What is claimed is:

1. A three point suspension device for suspending a cabin on a vehicle chassis comprising a first elastic connection assembly interposed between said chassis and said cabin at a central position adjacent the front portions of said chassis and cabin, said elastic connection assembly having a resonant frequency in the range of from about 1 to about 3 Hz, second and third connections interposed between said cabin and chassis, said second and third connections being disposed at a position rearwardly spaced from said first connection and being laterally spaced symmetrically to opposite sides of the longitudinal rolling axis of said cabin, and an anti-roll torsion bar assembly interposed between said chassis and cabin and positioned to restrain relative rotation of said cabin with respect to said chassis about said rolling axis.

2. A device in accordance with claim 1 wherein said first connection means includes stabilizer means engaging said cabin at laterally spaced positions to restrain said cabin adjacent said forward end against rotation about said rolling axis.

3. A device in accordance with claim 2 wherein said first elastic connection assembly includes a ball joint suspension member interposed between said chassis and cabin.

4. Apparatus in accordance with claim 2 wherein said anti-roll bar assembly includes a transversely directed central branch pivotally connected to said cabin and longitudinally extending arms having end portions pivotally connected to said chassis.

5. Apparatus in accordance with claim 3 wherein said anti-roll torsion assembly is operatively connected to said first elastic connection assembly.

6. Apparatus in accordance with claim 4 wherein said ends of said arms of said anti-roll bar assembly are connected to said chassis by spherical joint members.

7. Apparatus in accordance with claim 1 and including an arm extending rearwardly from said first suspension means, and an extensible jack member interposed between said arm and said chassis and adapted upon extension to tilt said cabin relative to said chassis.

8. Apparatus in accordance with claim 1 wherein said anti-roll torsion assembly includes spaced side bars pivotally secured to said chassis and extending forwardly, the forwardmost end of said side bars including a transverse end bar, and said elastic connector assembly is mounted on said end bar.

9. Apparatus in accordance with claim 7 wherein said anti-roll torsion assembly comprises the entire support for said first connection assembly.

* * * * *